United States Patent
Bar-Yaacov et al.

(10) Patent No.: US 8,176,183 B2
(45) Date of Patent: *May 8, 2012

(54) SYSTEM AND A METHOD FOR ACCELERATING COMMUNICATION OF TCP/IP BASED CONTENT

(75) Inventors: Assaf Bar-Yaacov, Haifa (IL); Sharon Aviran, Rehovot (IL)

(73) Assignee: Flash Networks Ltd, Herzliya (IL)

( * ) Notice: Subject to any disclaimer, the term of this patent is extended or adjusted under 35 U.S.C. 154(b) by 459 days.

This patent is subject to a terminal disclaimer.

(21) Appl. No.: 12/135,270

(22) Filed: Jun. 9, 2008

(65) Prior Publication Data
US 2008/0250103 A1    Oct. 9, 2008

Related U.S. Application Data

(63) Continuation of application No. 10/486,393, filed as application No. PCT/IL02/00654 on Aug. 8, 2002, now Pat. No. 7,398,314.

(60) Provisional application No. 60/310,895, filed on Aug. 8, 2001.

(51) Int. Cl.
*G06F 15/16* (2006.01)

(52) U.S. Cl. ....................................... 709/227

(58) Field of Classification Search ................. 709/227
See application file for complete search history.

(56) References Cited

U.S. PATENT DOCUMENTS

| | | | |
|---|---|---|---|
| 5,778,372 A | 7/1998 | Cordell | |
| 6,338,089 B1 * | 1/2002 | Quinlan | 709/227 |
| 6,389,462 B1 * | 5/2002 | Cohen et al. | 709/218 |
| 7,398,314 B2 * | 7/2008 | Bar-Yaacov et al. | 709/227 |
| 2002/0042839 A1 * | 4/2002 | Peiffer et al. | 709/238 |
| 2002/0071436 A1 * | 6/2002 | Border et al. | 370/395.32 |

OTHER PUBLICATIONS

RFC 2616—Hypertext Transfer Protocol—HTTP/1.1; Fielding et al; Jun. 1999; Copyright 1999.*
MFTP: Virtual TCP Window Scaling using Multiple Connections, David J. lannucci et al, Jan. 1992, Sections 1-6, Abstract.
Middleboxes: Taxonomy and Issues, B. Carpenter and S. Brim, IETF Standard-Working-Draft, Internet Engineering Task Force, IETF, Ch, No. 1, Jul. 1, 2001. Abstract, Sections 2.6-2.7 and Section 2.14.
Modeling the Performance of HTTP Over Several Transport Protocols, John Heidemann et al. IEEE/ACM Transactions on Networking, IEEE/ACM, New Your, NY, US, vol. 5, No. 5, Oct. 1, 1997. Abstract, Section II, p. 623 lines 1-13.

* cited by examiner

*Primary Examiner* — Phuoc Nguyen
*Assistant Examiner* — June Sison
(74) *Attorney, Agent, or Firm* — Smith Risley Tempel Santos LLS; Gregory Scott Smith

(57) ABSTRACT

A technique for downloading multiple objects from at least one server in an accelerated manner. Typically, in a TCP/IP environment, a client is limited in the number of sockets that can be opened for a single server. A spoofer (410) is utilized to intercept traffic between the server and the client and modify the traffic so that from the client's perspective, it appears as though objects from a single server are actually being sourced from multiple servers. Thus, the client is able to open additional sockets to receive objects from the server thereby allowing for a parallel download of the objects. This greatly reduces the amount of time necessary to download the objects.

15 Claims, 10 Drawing Sheets

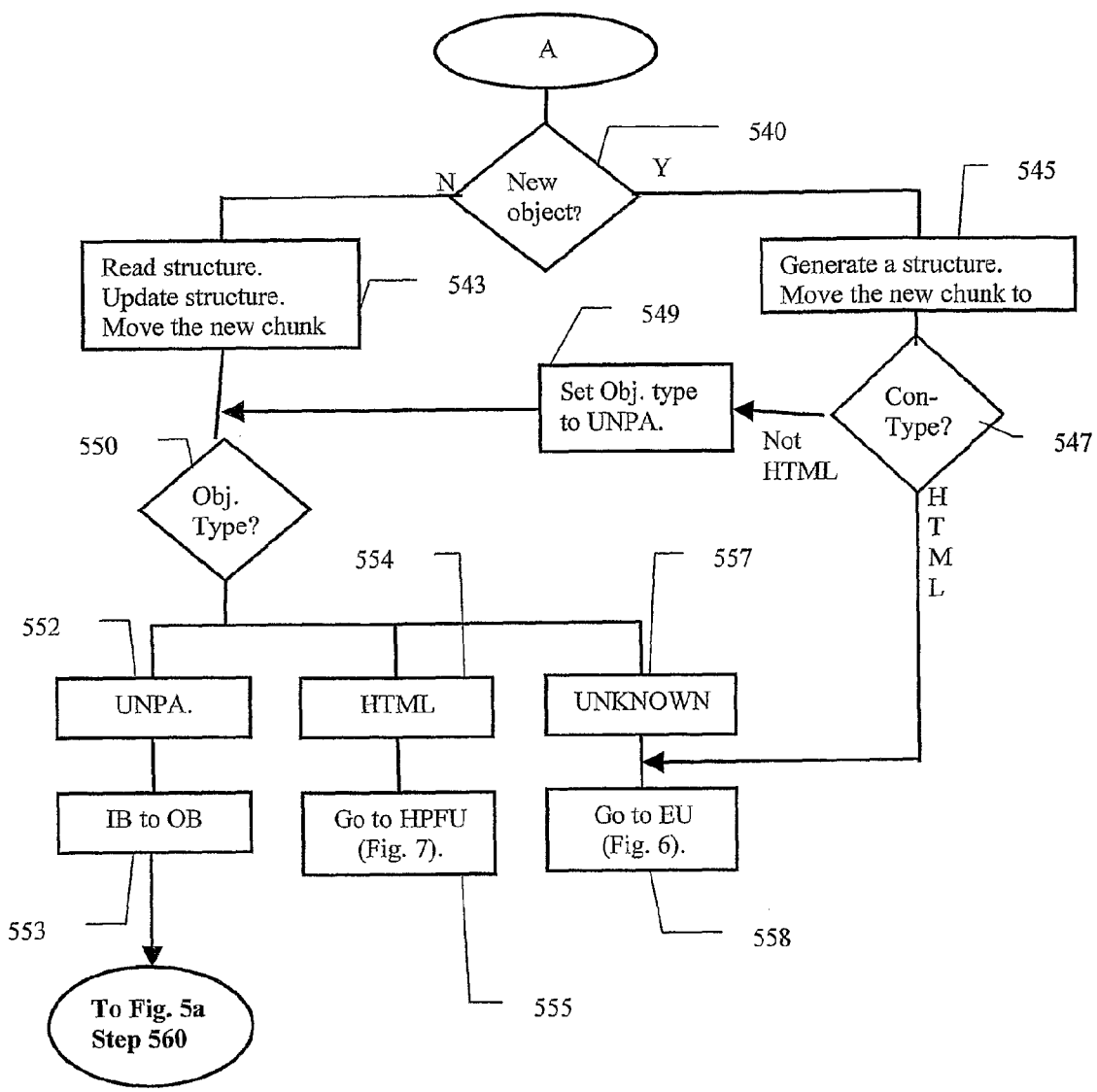

SYSTEM AND A METHOD FOR ACCELERATING COMMUNICATION OF TCP/IP BASED CONTENT

CROSS-REFERENCE TO RELATED APPLICATION

This application is a continuation of U.S. application for patent filed on Feb. 6, 2004, and assigned Ser. No. 10/486,393, now issued as U.S. Pat. No. 7,398,314, which is an application filed under 35 USC 371 thereby claiming priority through PCT application No. PCT/IL02/00654 to the U.S. Provisional Application for Patent filed on Aug. 8, 2001, assigned Ser. No. 60/310,895 and entitled "A SYSTEM AND A METHOD FOR ACCELERATING COMMUNICATION, WHICH IS USING TCP/IP" the contents of both being hereby incorporated by reference.

FIELD OF THE INVENTION

The present invention relates to the field of data communications and, more specifically, to the enhancement of perceived data throughput in a server/client communications system.

BACKGROUND OF THE INVENTION

In recent years the global data communication network known as the Internet has experienced explosive growth. In conjunction with this growth, there has also been a substantial increase in the number of private networks that use protocols and standards similar to those used on the public Internet (i.e., Intranets). These Intranets are typically used by corporations and authorized users for the sharing of data and resources and utilize a Gateway (GW) as an interface between the Intranet and the Internet. Presently, many users of these Intranet networks and the Internet are experiencing severe communication constraints due to the inefficient handling of existing protocols and the overload of the network.

The Internet or Intranets are typically configured to utilize either the Transmission Control Protocol/Internet Protocol (TCP/IP) or User Datagram Protocol Internet Protocol (UDP/IP) to establish the communication between a client that is using a Hyper Text Transfer Protocol (HTTP) Internet browser and HTTP servers, FTP servers or the like.

During typical operation of the Internet, a web server (such as an HTTP server) receives a content request from a client. The web server can respond to a client's HTTP request by transmitting a presentation language document to the client. The "presentation language" (or also referred to as P/L) document, regardless of the format and markup language used, defines the web page layout, fonts and graphic elements Active-X controls, JAVA scripts or applets, as well as the hypertext links to other web pages, sites or functions. Each link contains the URL (Universal Resource Locator), or address, of a web page on the same server or on any other server connected to the Intranet or the Internet.

The technical and functional aspects of HTTP, HTML and other P/L formats should be well known to those skilled in the art and, additional information on these subjects can be obtained by reviewing the "Internet Engineering Task Force" site that is accessible at the following URL: http://www.ietf.org.

From now on the discloser of the present invention refers to HTML as an exemplary P/L.

A client, upon receiving an HTML page from a server, parses the HTML page and opens TCP connections to the hosting computers of the different objects. The communication protocols put limitations on the number of concurrent connections that a client's browser can open per host. For example, HTTP 1.1 limits the browser to two connections per host. HTTP 1.0 limits the browser to four connections per host. Therefore, if a source of several objects is the same host, the browser, in case of HTTP 1.1, can open only two connections at a time and requests those objects as sequential pairs of objects, a pair after the other, via these two connections. Sequential download of objects is not efficient, since a download of an object consist of two periods: (1) the negotiation time and (2) the object sending time. The negotiation time, at the sever side, is the time from sending the last bit of the previous object until the time of receiving the first bit of the following request. During this period, the server does nothing for the client. In a process of downloading a common page in a common Bandwidth (BW) of 1.5 KBps and objects with average size 1.2 KB, the negotiation time takes about 25% of the total time. FIG. 1 is a time diagram illustrating such a common download time of 8 objects using HTTP 1.1 with two TCP connections (TCP 1 & TCP 2) at a time between the client and the host. The negotiation time for the first and the second objects is between T0 to T1 (about 3 time units), then the transmitting of the first two objects is the time between T1 to T2 (about 10 time units). At the end of the transmitting of the first two objects a negotiation for the next two objects starts on T2 until T3 subsequently the transmitting of the two objects that took the time between T3 to T4 and this process continues to the end of the last two objects. The total time is about 52 time units. The size of a time unit depends on the properties of the network and it may be in the range of few milliseconds to few hundreds of milliseconds.

Using the same BW of the network but increasing the number of TCP connections to 8 connections enables the simultaneous download of these 8 objects and eliminates the negotiation time before each object. The download of each object will be longer than before (about 40 time units, due to the usage of the same BW) but the total download time of all 8 objects will be shorter (about 42 time units). FIG. 2 is a time diagram illustrating the same download of 8 objects using HTTP 1.1 but this time with 8 TCP connections.

Therefore there is a need for a system and a method that can reduce the download time of web based data by reducing the portion of the negotiation time. Such a system can increase the speed of the communication.

SUMMARY OF THE INVENTION

The present invention provides a system and a method that allows downloading of several objects in parallel from the same server to the same client. One aspect of the present invention operates to spoof the client's browser and thereby trick the client's browser into believing that the source of the several objects is not the same host but several different hosts. Thus, the client's browser may open more than two connections in parallel and download more than two objects simultaneously from the same host. The present invention handles the traffic between the Intranet and the Internet while passing via the GW. The present invention modifies the information that is coming from the Internet to the Intranet and re-modifies the information, that is coming from the Intranet, to the original information. Using this approach the present invention keeps the traffic between the GW and the Internet without any modifications. Therefore the present invention is transparent to the server on the Internet and to the client on an Intranet.

In an exemplary embodiment of the present invention, one or more aspects of the invention may be implemented within a software program running at the application level of the GW computer. The present invention may operate to control the communication between the Intranet clients via the GW to the Internet. This aspect of the present invention operates to parse chunks, packets, or blocks of data. If a chunk is an HTML response from a server to a client located on the Intranet, this aspect of the present invention will operate to modify the URL (Uniform Resource Locator) of the object in such a way that each object gets a different source address—a fake address that does not really exist. Performing this operation results in tricking the client's browser into believing that the objects of the HTML page are being sourced from more than on host (i.e., are spread over several hosts). The number of fake addresses that are utilized can depend on the bandwidth (BW) that is dedicated to the client. In a typical embodiment, four fake addresses per an HTML page is a typical configuration. Utilizing four fake addresses results in allowing eight parallel connections between the client and the same web server.

In an exemplary embodiment of the present invention, the correct address and the appropriate fake address is stored within a table. The correct address can then be recalled prior to sending a request to the Internet, and the request can be converted back to its original configuration—one with valid URLs rather than fake addresses.

In another exemplary embodiment, a marker code may be added at the end of the faked address a marker code and then the original address instead of using the previous table.

During receiving a request from a client, the present invention parses the URL of the request and if the present invention recognizes that the request is with a fake address the present invention corrects, re-modifies, the URL to the right one and transfers the request to its original destination via the Internet.

An exemplary embodiment of the present invention selects the fake addresses from addresses, which are not yet in use. A list of addresses, which are currently not occupied, is published in IP standard RFC 791.

Another exemplary embodiment of the present invention selects the fake addresses from a list of addresses, which have been purchased for this purpose.

The present invention can be additional software residing in the GW computer or additional processor(s) connected to one or more GWs in the same site.

The following description refers to HTML as an exemplary "presentation language" but someone who is familiar in the art can appreciate that the invention can be used for other type of Markup Languages, such as but not limited to: XML, DHTML etc.

Other objects, features, and advantages of the present invention will become apparent upon reading the following detailed description of the embodiments with the accompanying drawings and appended claims.

BRIEF DESCRIPTION OF THE DRAWINGS

FIG. 5a and FIG. 5b are two parts of a flow diagram illustrating the method in which an exemplary Spoofer operates.

DETAILED DESCRIPTION OF THE PREFERRED EMBODIMENT

Figure 1:
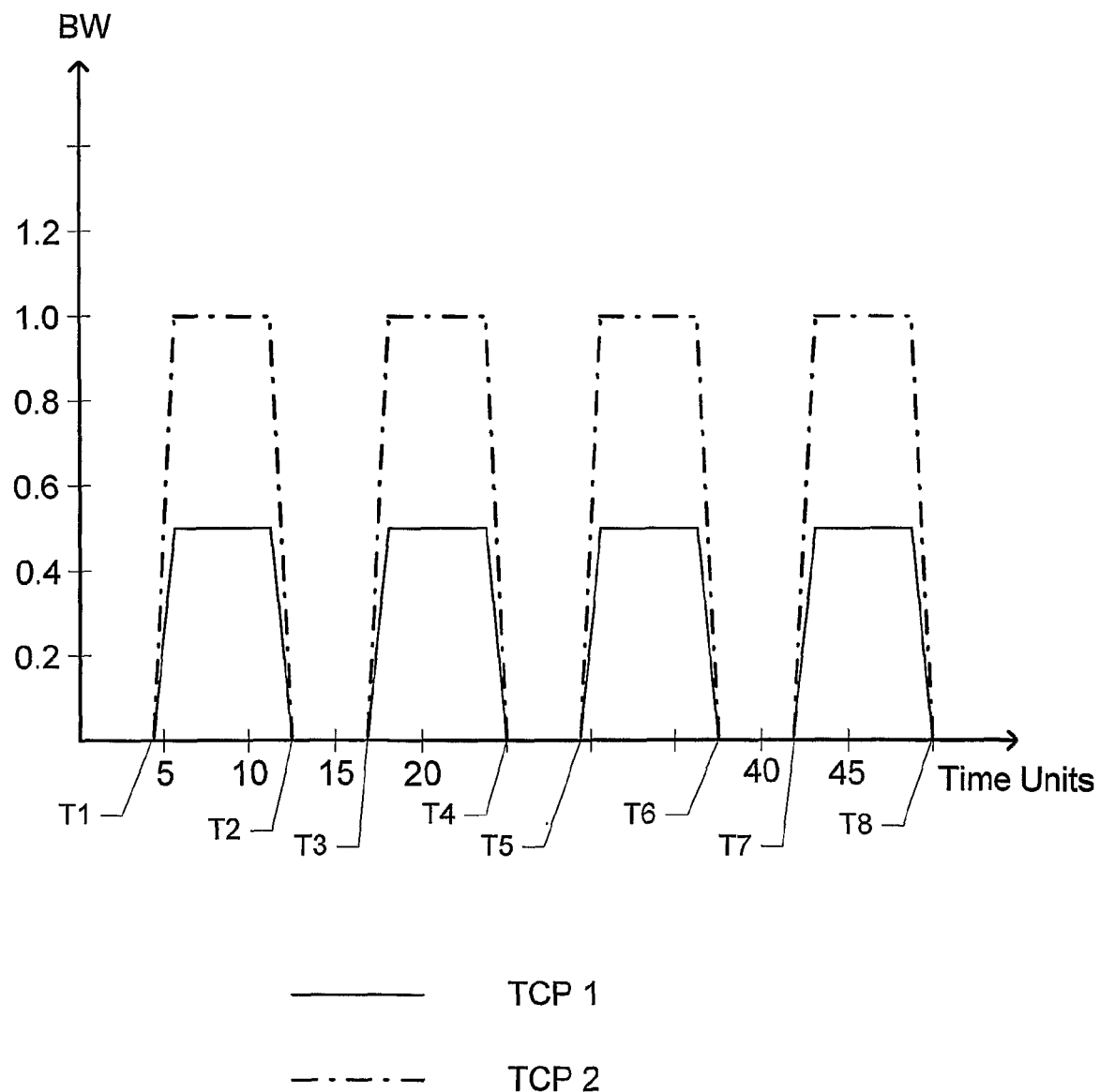
FIG. 1 is a time diagram illustrating a common download of 8 objects, from the same host, using HTTP 1.1 with two TCP connections per host.
Figure 2:
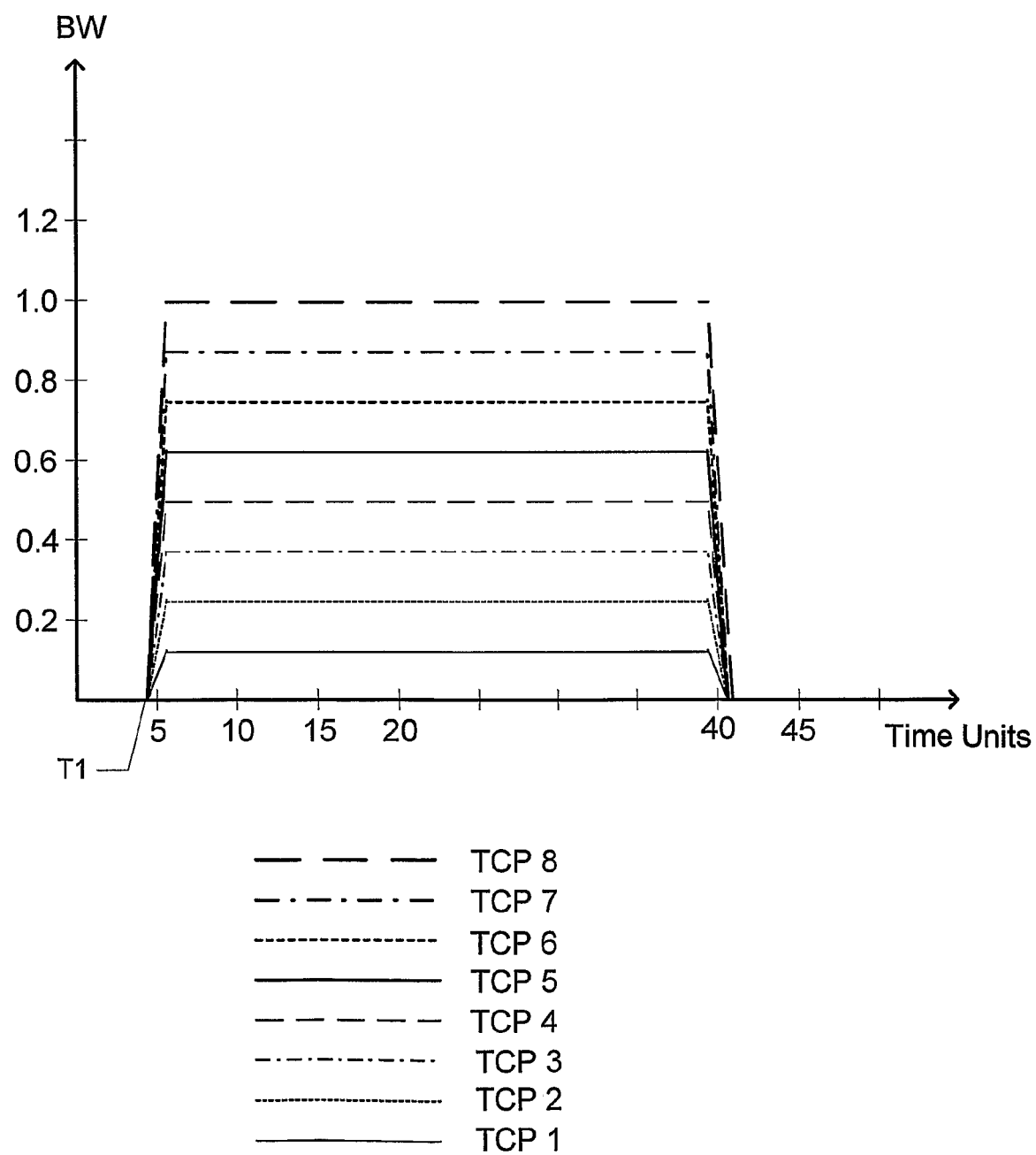
FIG. 2 is a time diagram illustrating the download of the same 8 objects using the same BW and HTTP 1.1, but this time with four fake addresses and two TCP connections per address.

The present disclosure presents a system, operating within a TCP based data network, to reduce the time required for downloading a plurality of objects belonging to the same page, by allowing a large number of TCP connections between a client and at least one host, which has more than two of the objects, to be opened. One embodiment of the disclosed system includes a spoofer operable to intercept a plurality of data chunks of a plurality of objects being exchanged between the client and the host. For each particular object, the spoofer creates an input buffer for storing received data chunks associated with the particular object, creates an output buffer for storing data chunks to be transmitted; creates a first socket for interfacing to the client and a second socket for interfacing to the host; and creates a structure to maintain information pertaining to the particular object. Further, for each particular data chunk received, the system identifies the object type of the data chunk; and processes the data chunk in accordance with the object type.

Some embodiments of the system include an HTML parse functional unit operable to parse the input buffer and examine the structure for a particular object and replace the addresses and host names in the input buffer with fake addresses and fake host names and transfer the modified data of the input buffer to the spoofer to be stored in the output buffer. In addition, such embodiments may include a request parse functional unit operable to parse the input buffer and examine the structure for a particular object and restore the data in the input buffer to the correct addresses and host names and transfer the modified data of the input buffer to the spoofer to be stored in the output buffer.

In some embodiments of the system, the HTML parse functional unit is operable to replace the address in the input buffer by adding a marker code to the address that can be subsequently recognized and that makes the address invalid. In addition, the request parse functional unit is operable to restore the address in the input buffer by detecting and removing a marker code in the address.

In some embodiments of the system, the HTML parse functional unit is operable to replace a host name in the input buffer by substituting the host name with a fake host name that has not yet been assigned and to maintain a look up table to associate the host name with the fake host name. In addition, in some embodiments the request parse functional unit is operable to restore a host name in the input buffer by substituting a fake host name with a host name that appears in the look up table and that is associated with the fake host name.

In some embodiments of the system, the HTML parse functional unit is operable to replace the address in the input buffer by substituting the correct address with an invalid address and maintain the relationship between the correct address and invalid address in a look up table and, wherein the request parse function unit is operative to restore the data in the input buffer to the correct addresses by extracting the correct address from the look up table and substituting the invalid address with the correct address.

The present disclosure also presents a method for opening a large number of TCP connections between a client and a host. The disclosed method spoofs the client that a plurality of objects, which are located on the same host, are spread over plurality of different fake hosts, whereby the client opens more connections to the real host and reduces the download time of said plurality of objects. In some embodiments, this method is transparent to the client. Further, in some embodiments the method is transparent to the web server. In some embodiments of the method, the fake location of an object indicates the real host of said object.

In some embodiments, the method may further manage the flow of each TCP connection of said plurality of connections from an integrated congestion management module.

The present disclosure also presents a method for opening a large number of TCP connections between a client and at least one host, where the method receives a presentation language document from a server in response to a request from a client, the presentation language document identifying a particular set of web content to be downloaded, the particular set of web content comprising a plurality of objects residing on the same host. Further, the method modifies the source address and the host name of at least one object so as to create the appearance that the objects, which reside on the same host, are coming from different hosts, whereby the client can open a TCP connection for each such object.

Referring now to the drawings, in which like numerals refer to like parts throughout the several views, exemplary embodiments of the present invention are described.

Figure 3:
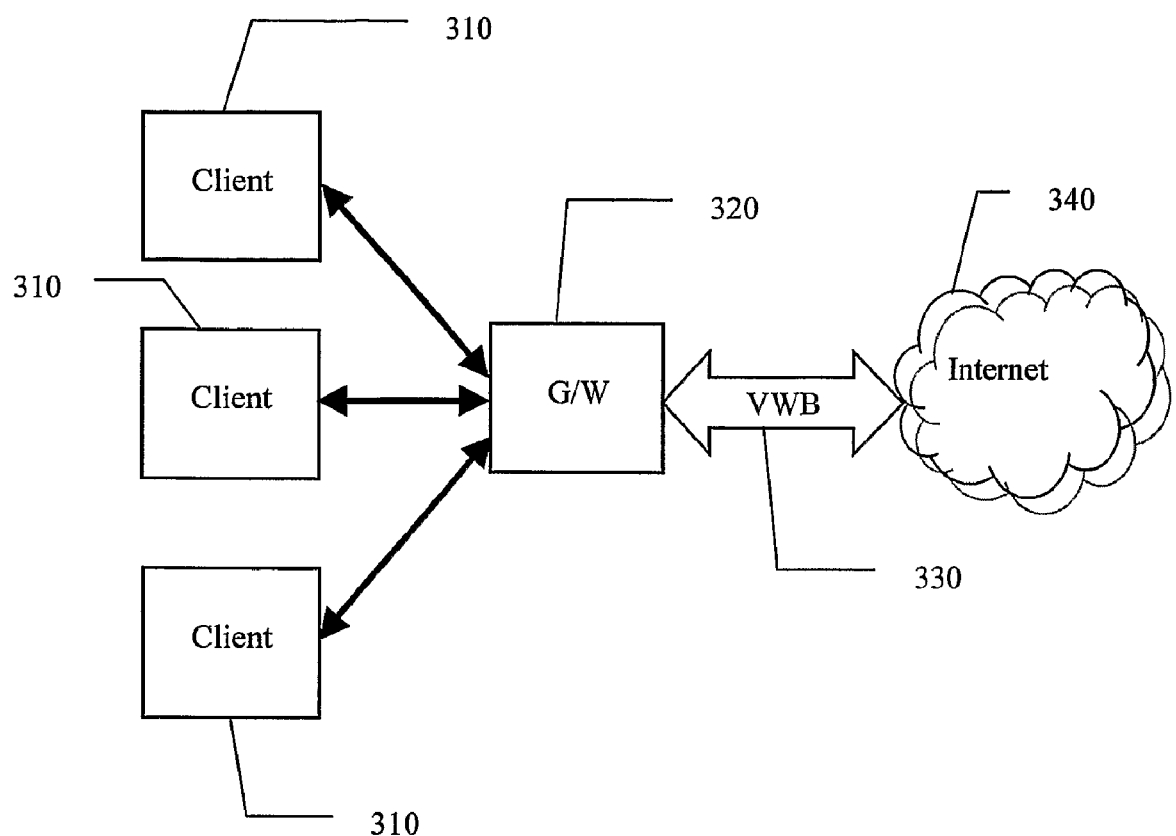
FIG. 3 is a block diagram illustrating a general description of a typical environment in which the invention can be used.

FIG. 3 is a block diagram illustrating a general environment in which the invention may be used. For example, FIG. 3 may represent a cellular communication network. In such a cellular communication network, a client 310 can be a cellular telephone, or a laptop computer or other device connecting to the cellular network via a cellular modem, each of which is running Internet browser software or some other program to access the Internet. The gateway (GW) 320 is a server in an operator site that serves all said clients 310 and is connected via a VWB (Very Wide Bandwidth) link 330 to a data network 340.

FIG. 3 may also represent a satellite communication network. In a satellite communication network, the GW 320 is located in a satellite station and the clients 310 are satellites users.

FIG. 3 may also represent a distribute data network, such as the Internet or an intranet. In this example, the client 310 may be any device connecting to the data network and the GW 320.

One aspect of the present invention is a Fake Module (FM) that resides in or operates in conjunction with a GW 320 that is interconnected or communications with a digital network, such as the Internet. The FM operates to intercept traffic passing between clients and web servers. The reader will understand that the terms client and server are used in the generic sense to imply the role of various devices. In reality, a particular device may operate as a server and/or a client depending on the particular situation. In an illustrative example, the FM may intercept traffic between a client on an Intranet and a Web Server (WS) operating on the Internet. One aspect of the FM is the ability to change the hosting computer name and/or address, and the address of the objects.

Figure 4:
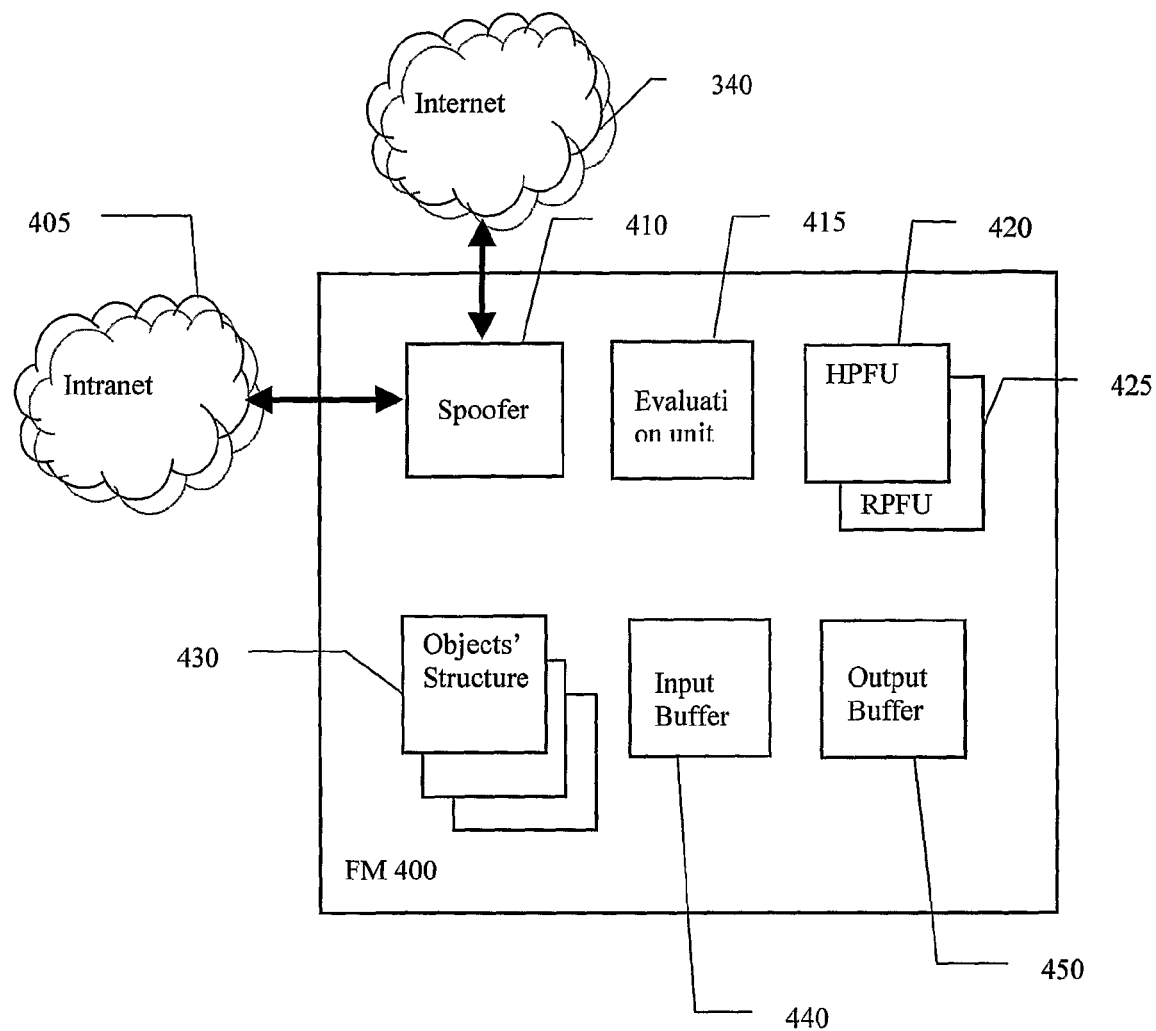
FIG. 4 is a block diagram illustrating an exemplary embodiment of the present invention.

FIG. 4 is a block diagram illustrating the functional structure of an exemplary embodiment of a Fake Module (FM) 400. The FM 400 includes the following logical modules: a Spoofer (SP) 410; an Evaluation Unit (EU) 415; two Parse Functional Units, one for HTML (HPFU) 420 and one for client's Request (RPFU) 425; a bank of Structures 430 one for each object which is currently downloaded; an Input Buffer (IB) 440 to store the portion, or the chunk, of an object which is currently downloaded and an Output Buffer (OB) 450 for the chunk being processed.

SP 410 acts as a transparent proxy. In operation, a client interconnected to the Intranet 405 sends packets directly to a web server interconnected to the Internet 340. The SP 410 intercepts these packets, answers the client with the web server IP address, and creates a socket between the client 310 and the SP 410. In addition, the SP 410 creates a socket between itself and the web server. Once the two sockets are established, the SP 410 takes data from one socket, processes the data and passes it as is or as modified to the other socket. The detailed operation of SP 410 is described in conjunction with FIG. 5.

The EU 415 receives data from the SP 410 and determines whether the data can be processed or modified. Two types of data can be modified by the present invention: (1) a Request or (2) an HTML page. Otherwise, the data is classified as UNKNOWN and the EU 415 needs additional information or date before it can analyze the type of data or the data is simply UNPARSABLE. The detailed operation of the EU 415 is described in conjunction with FIG. 6.

If the received data is an HTML page it is transferred to HPFU 420. If the received data is a Request, the EU 415 transfers the data to the to the RPFU 425. If the received data is neither an HTML page nor a Request, the EU 415 returns processing control to the SP 410.

The HPFU 420 and the RPFU 425 modify the data and return the modified data to the SP 410, which subsequently sends the modified data to its destination. The detailed operation of the HPFU 420 is described in conjunction with FIG. 7 and the detailed operation of the RPFU 425 is described in conjunction with FIG. 8.

Structure 430 is a data structure and is used to store information required to keep track of the progress of an entire object be processed or modified. Upon receiving a new Request, the SP 410 generates a new structure to be associated with the new object. The SP 410 deletes the structure upon receiving a complete response to said object. When received data is to be modified, the SP 410 provides the necessary FM components, those components that will operate on the data, with the structure that belongs to the object to be modified, and every new chunk of data received. In response, the SP 410, receives an updated structure from the appropriate FM component, together with the processed data. Upon receiving the processed data of the last chunk of the response to the object, the SP 410 deletes the corresponding structure of the object.

An exemplary structure utilized by an embodiment of the present invention may include but is not limited to, the following information:

The ID number of the object, which is corresponding to the structure.
Real Host—the real name of the host of the object.
A field for the source of the object—the client or the server.
The type of the object.
A pointer to the starting address of the new chunk, the starting address of the IB.
The length of the IB.

A pointer to the starting address of the next OB, in which the modified chunk will be written.

A location in which the length of the OB will be written.

A part of the previous chunk that may be needed for processing the next chunk.

Etc.

The Input buffer 440 is a buffer that the SP 410 writes or stores any new chunk of data as they are received. The present invention operates to process data in the IB 440 based on the information that is stored in the appropriate structure 430.

The Output buffer 450 is a buffer in which the present invention operates to store the processed data of the current chunk. SP 410 transfers the data from the OB to its destination.

The IB 440 and the OB 450 depend on the current chunk that is processed by the present invention and are deleted upon terminating or completing processing of the current chunk. Different chunks of the same object may have different IBs and OBs.

Figure 5A:
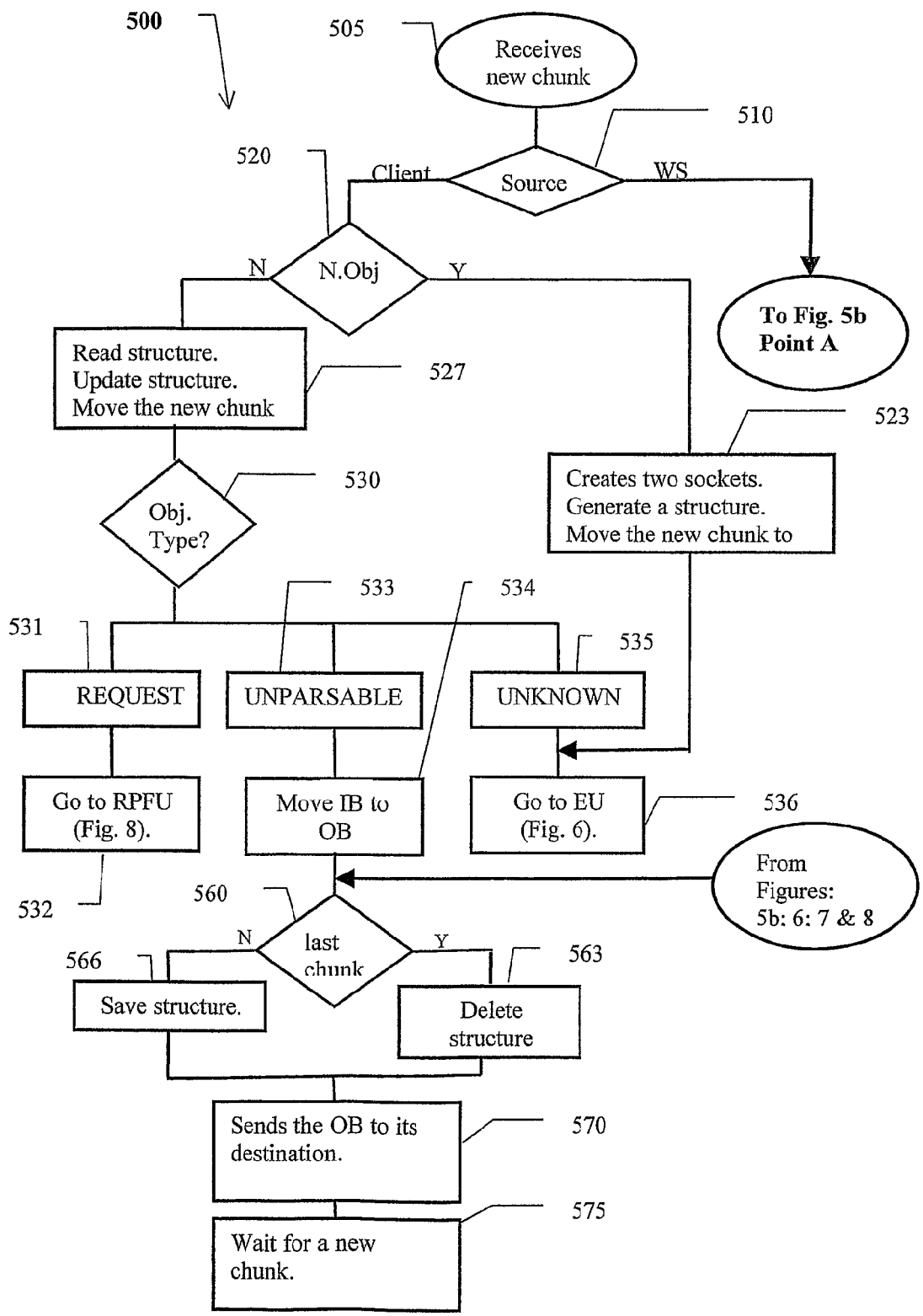

FIG. 5a and FIG. 5b are two parts of a flow diagram illustrating a method in which an exemplary SP 410 may operate. The flow diagram 500 of SP 410 starts at step 505 when it receives 505 a new chunk of data. The new chunk of data may be a packet of data that is transferring between the Internet 340 and the Intranet 405. At decision block 510, the SP 410 checks whether the source is a client or a web server. If the source is the web server, processing continues at step 540 in FIG. 5b.

If the source is a client 310, at decision block 520 the SP 410 checks whether the chunks belong to a new object. If the chunks belong to a new object, at step 523 the SP 410 provides the client 310 with the web server IP address and creates a socket between the client and the SP. Packets from a client 310 to the SP will have Source IP: client and Dest IP: web server and packets from the SP to the client will have Source IP: web server and Dest IP: client.

At step 523, the SP 410 also creates a socket between the SP and the web server. Packets from the SP to the web server will have Source IP: Spoofer and Dest IP: web server and packets from the WS to the SP will have Source IP: web server and Dest IP: Spoofer.

After establishing the two sockets for the connection, the SP 410 (FIG. 4) generates a new structure, which will be associated with said object. In an exemplary embodiment, the new structure may include information such as, but not limited to:

The ID number of the object associated with the structure.

The real name of the host of said object.

Allocation for a field that will contain the type of the object. The EU 415 will fill this location later.

Source Field identifying the source of the object as the client.

A pointer to the starting address of the new chunk (the starting address of the IB).

The length of the current IB.

A pointer to the starting address of the OB where the modified chunk will be written.

Allocation for a field in which the length of the OB will be written.

Allocation to save part of this chunk that may be needed for processing the next chunk (this is referred to as the remainder).

Allocation for a field in which the Maximum Number Of Fake Hosts will be written (MNOFH).

Allocation for a field in which the Current Number of the Fake Host (CNFH) will be written.

After initiating the associated structure, the SP 410 moves the data of the new chunk into the IB 440 and, at step 536, the SP 410 calls or passes control to the EU 415. The operation of EU 415 in response to this call is described in conjunction of FIG. 6.

Returning to decision block 520, if the object is not a new object, at Step 527 the SP 410 (FIG. 4) reads the structure associated with the object and updates the structure with the relevant information regarding the new chunk (such as but not limited to the size of the new IB, the location for the new IB and OB etc.). Then the SP 410 moves the data of the new chunk into the IB.

At decision block 530, based on the type of the object stored in the structure, the SP 410 decides how to proceed with the processing of the new chunk.

Figure 8:
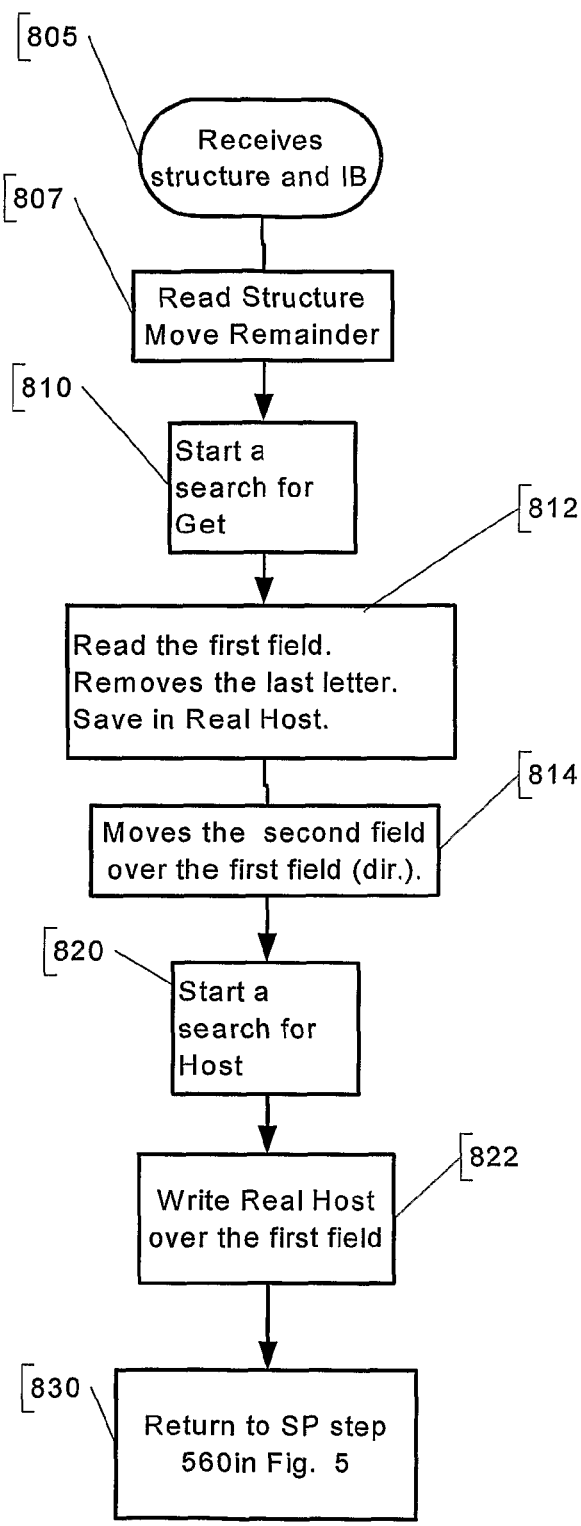
FIG. 8 is a flow diagram illustrating the method in which an exemplary RPFU 425 processes a client's request (from step 532 in FIG. 5a).

If the type is of the object is a Request 531, at step 532 the SP 410 calls the RPFU 425, which is described in conjunction with FIG. 8.

Figure 6:
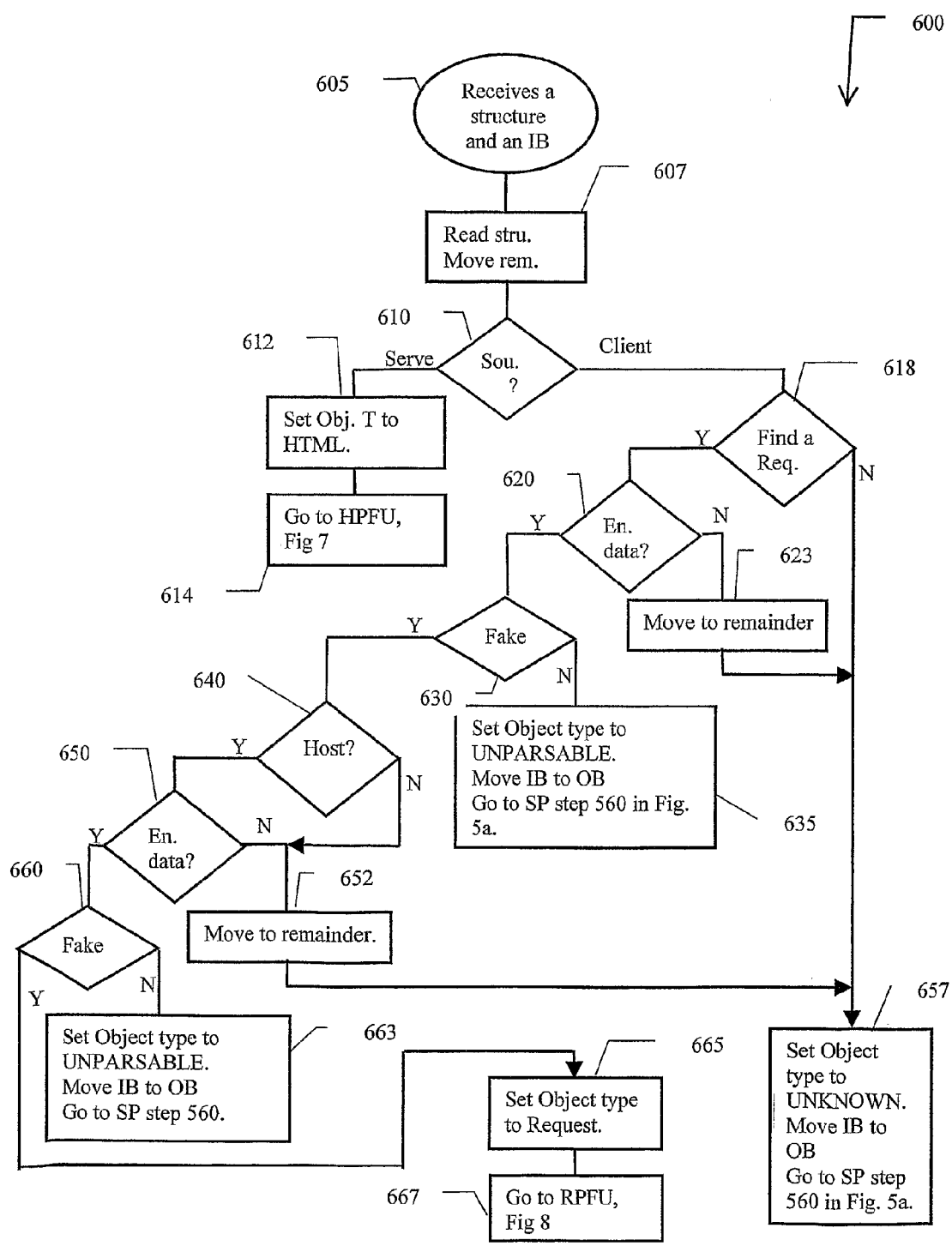
FIG. 6 is a flow diagram illustrating the method in which an exemplary Evaluation Unit evaluates an object (from step 536/558 in FIG. 5a/5b).

If the type is of the object is UNKNOWN 535, at step 536 the SP 410 calls the EU 415, which is described in conjunction of FIG. 6.

If the type is of the object is UNPARSABLE 533, at step 534 the SP 410 moves the IB as is without any modifications to the OB. At decision block 560, the SP 410 (FIG. 4) checks whether the current chunk is the last chunk of the object. If the current chunk is the last chunk, at step 563, the SP 410 deletes the associated structure. If the current chunk is not the last chunk, at step 566 the SP 410 saves the structure for the next chunk of the same object. In either case, processing then continues at step 570 where the SP 410 sends the OB to its destination via the socket of the current object with the appropriate IP addresses. Packets to a web server carry source IP: Spoofer; Dest IP: web server and packets to a client carry source IP: web server Dest IP: client.

At step 575 the SP 410 waits for a new chunk and once the new chunk is receive, the SP 410 (FIG. 4) returns to step 505 to process the new chunk. The new chunk can be the next chunk of the same object or of another old object or the first chunk of a new object.

Returning to decision block 510, if the source of the new chunk is the web server, the SP 410 continues processing at decision block 540 in FIG. 5b where the SP 410 (FIG. 4) checks whether the new chunk belongs to a new object. If the new chunk belongs to a new object, at step 545 the SP 410 generates a new structure as described above but this time the SP writes in a field that indicates the Source of the object, that the source of said object is the web server and moves the new chunk into the IB. At decision block 547, the SP 410 checks whether the "Content-Type" field exists. If there is no "Content-Type" field, then the object is a not an HTML page, but rather may be a Response (i.e., an image). In such a case, at step 549 the Then SP 410 sets the Object Type field in the structure to UNPARSABLE and continues processing at decision block 550.

If at decision block 547 the "Content-Type" field exists and its value is "text/html" or "application/x-JavaScript", the SP 410 continues to step 558 where the EU 415 (FIG. 4) is called.

Returning to decision block 540, if the object is not new, at step 543 the SP 410 reads the structure, updates it as described in conjunction with step 527, and moves the new chunk into the IB.

A decision block 550, the structure is examined to ascertain the object type of the new chunk. If the object type is UNPARSABLE 552, at step 553 the SP 410 moves the IB, as is, without any modifications, to the OB and continues processing at step 560 in FIG. 5a. If the object type is an HTML page 554, then at step 555 the SP 410 (FIG. 4) calls the HPFU 420

(FIG. 4), which is below in conjunction of FIG. 7. If the object type is UNKNOWN 557, at step 558 the SP 410 calls the EU 415, which is described in conjunction of FIG. 6.

FIG. 6 is a flow diagram illustrating the method in which an exemplary Evaluation Unit 415 (FIG. 4) evaluates an object. The operation 600 of the EU 415 starts at step 605 upon receiving an IB and a structure from SP 410. At step 607, the EU 415 reads the structure and moves the remainder field, if one exists, to the beginning of the input buffer. The remainder contains information from previous IB that may be needed for evaluating the current IB. For example the remainder may contain a beginning of a request e.g.: "GE", which was found at the end of the previous IB.

At decision block 610, the EU 415 determines whether the source of the object is it the web server or the client. If the source is the web server, then at step 612 the EU 415 (FIG. 4) sets the object type field in the structure to HTML. Then at step 614, the EU 415 calls the HPFU 420 (FIG. 4) and transfers, the IB with the update structure, to it. The operation of the HPFU 420 is described in conjunction with FIG. 7.

At decision block 610, if the source is the client, processing continues at decision block 618 where the EU 415 checks whether the new chunk is a Request. This check is performed by the EU 415 searching the IB for an object that has a first word that starts a request, like but not limited to: GET, POST, HEAD, PUT, DELETE, TRACE, OPTIONS or CONNECT. For simplicity purposes, the description refers to GET as an exemplary representation of each of these words. If the search reaches the end of the IB without finding any of those word, or even the beginning of any of them, processing continues at step 657 where the EU 415 (FIG. 4) sets the Object type to UNKNOWN, moves the IB as is to the OB and returns the updated structure and the OB to the SP 410 at step 560 in FIG. 5a.

At decision block 618, the search has ended successfully by finding a Request or finding the beginning of a Request. At decision block 620, the EU 415 determines if enough data has been received to evaluate the Request. If an insufficient amount of data has been received, processing continues at step 623 where the EU 415 transfers the relevant information from the IB into the remainder field of the structure and processing continues at step 657.

However, if a sufficient amount of data has been received at decision block 620, processing continues at decision block 630 where the EU determines if the Request is a fake Request (a request having a fake address). A Request can be marked as a fake using a variety of techniques. In an exemplary embodiment, a request is marked as a fake request by using a fake address with double letters at the end of the address and a fake host number. Two examples of fake requests are as follows:

1. GET/www.walla.co.ill/images/1.gif
Host: 1.1.1.1
2. GET/www.cnn.comm/top.gif
Host: 1.1.1.3

The fields, "www.walla.co.ill" or "www.cnn.comm", are modifications of the real addresses of the host of the object ending with double letters ll or mm respectively. The real addresses are www.walla.co.ill or www.cnn.com respectively. The host address is a fake address, which is not yet in use.

Thus, at decision point 630, the EU 415 decides if the request is a fake one by determining if the last two letters are the same. If it is not a fake request, e.g. the last two letters are different, processing continues at step 635 where the EU 415 sets the object type in the structure to the UNPARSABLE value, moves the IB to the OB and returns the updated structure and the OB to the SP 410 (FIG. 4) at step 560 in FIG. 5a.

On the other hand, if it is a fake request, e.g. the last two letters are the same, processing continues at decision point 640 where the EU 415 (FIG. 4) starts searching for a host. If the search for a host ends without finding a host, the EU 415 transfers the part of the IB, from the beginning of the request to the end of the IB, to the reminder field in the structure. Processing then continues at step 657 where the EU 415 sets the object type to the UNKNOWN value, moves the rest of the IB as is to the OB and returns the updated structure and the OB to the SP 410 at step 560 in FIG. 5a.

At decision block 640, if the search for a host ends by finding a host or at least the beginning of a host, at step 650 the EU 415 determines if there is enough data for evaluating the host address. If an insufficient amount of data has been received, the EU 415 continues processing at step 652 where the part of the IB, from the beginning of the request to the end of the IB, is transferred into the reminder field in the structure and processing continues at step 657 as previously described.

At decision block 650, if the EU 415 determines that sufficient data has been received, processing continues at decision block 660 where the EU 415 determines if the address of the host is a fake address (e.g. 1.1.1.1 or 1.1.1.3. etc.). If the address is not fake, at step 663 the EU 415 sets the object type in the structure to the UNPARSABLE value, moves the IB to the OB and returns the updated structure and the OB to the SP 663 at step 560 in FIG. 5a. If the address is fake, processing continues at step 665 where the EU 415 sets the object type field in the structure to the REQUEST value, and at step 667, calls the RPFU 425 and transfers the IB with the updated structure to the RPFU 425.

Other requests will not be classified as requests, since they are not requests that are addressed to fake hosts, and therefore don't need any parsing.

Thus, processing by the EU 415 concludes in one of four possible manners: (1) calling the HPFU 420 (step 614); (2) calling the RPFU 425 (step 667); (3) setting the object type to the UNKNOWN value and returning control to the SP 410 at step 560 to get more information that may help to evaluate the object (step 657), or (4) setting the object type to the UNPARSABLE value and returning control to the SP 410 at step 560 (steps 635 or 663). The EU 415 then waits to get a new IB, from the same object or another object, with the relevant structure.

Figure 7A:
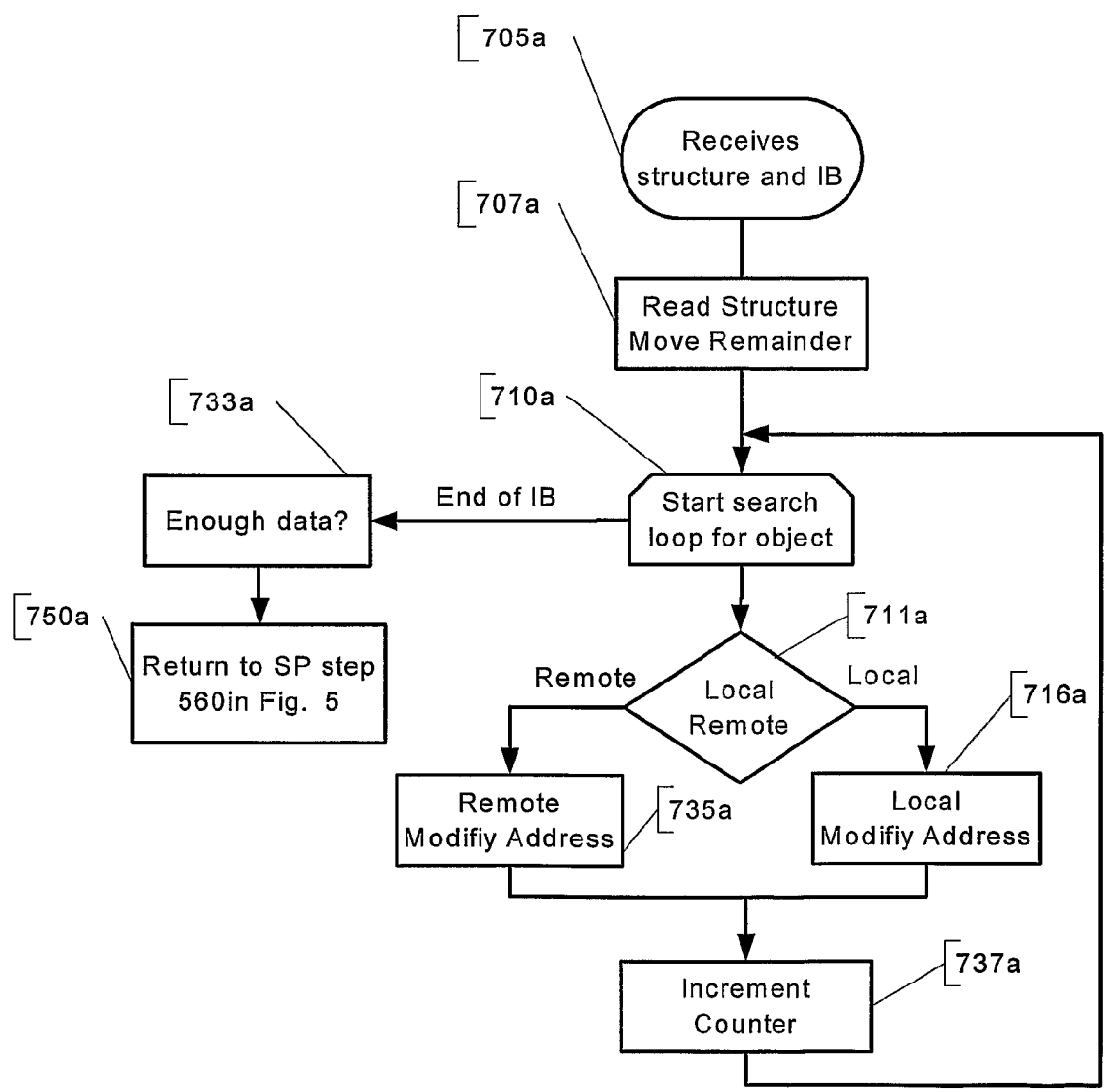
FIGS. 7a & 7b are flow diagrams illustrating the method in which an exemplary HPFU process an HTML page (from step 555 in FIG. 5b).

FIG. 7a is a flow diagram illustrating a method in which an exemplary HPFU 420 processes an HTML page. The HPFU 420 (FIG. 4) process 700a starts at step 705a upon receiving an IB and a structure from the SP 410 or from the EU 415 (FIG. 4). At step 707a, the HPFU 420 reads the structure, moves the remainder field, if one exists, to the beginning of the input buffer and copies the expanded IB, i.e. the remainder followed by the IB, into the OB. The remainder contains information from previous IB that may be needed for processing the current IB.

At step 710a, the HPFU 420 searches the expanded IB for a reference to an object. An object may reside in the same host or the web server. For example, if the web server address is www.walla.co.il, the reference to a local object will be:

<IMG SRC ="/dir/object"> for example:
<IMG SRC ="/images/2.gif">.

Alternatively, an object may reside in another host. For example, if the web sever address is www.walla.co.il, the reference to a remote object will be:

```
<IMG SRC ="http://Real host/dir/object">, for example,
<IMG SRC ="http://flashnetworks.com/images/2.gif">.
```

The HPFU 420 starts searching for the keyword SRC and then for the other fields.

If the search ends successfully, at decision point 711*a*, the HPFU 420 examines the first field to determine whether the object is a local or remote object. If the object is a local object, then at step 716*a*, the HPFU 420 modifies the reference of the object into a reference of an object that resides in a fake host. The HPFU 420 adds two fields to the reference: one for the fake host and one for the real host with the marker code at the end. An example for a marker code is doubling the last letter of the real host. For the above examples, the new fake reference will be:

```
<IMG SRC ="http://fake host/real hostt/dir/object">, e.g.:
<IMG SRC ="http://1.1.1.N/www.walla.co.ill/images/2.gif">.
```

The value of N in the fake address is the Current Number of Fake Hosts (CNFH), which is written in the structure. Then the HPFU 420 replaces, in the OB, the real reference with the fake one.

In another embodiment of the present invention, the value N can be used as a pointer to the location in a memory, in which the real address is saved. This location will be used during the re-modification stage.

In other embodiments other parts of the fake address may be used as a pointer to the real address.

At step 737*a*, The HPFU 420 increases the CNFH by one and checks if the new value of CNFH is equal to the Maximum Number Of Fake Hosts (MNOFH) stored in a field in the structure. If the CNFH is equal to the MNOFH, the HPFU 420 sets value of the CNFH to one. The HPFU 420 then returns to step 710*a* for searching the next reference to an object.

At decision block 711*a*, if the object is a remote object, then at step 735*a* the HPFU 420 modifies the reference of the remote object into a reference of an object that resides in a fake host. The HPFU 420 adds a field for the fake host and adds a marker code at the end of the real host. An example for a marker code is doubling the last letter of the real host. For the above examples the new reference will be:

```
<IMG SRC ="http://fake host/real hostt/dir/object">, e.g.:
<IMG SRC ="http://1.1.1.N/www.flashnetworks.comm/images/2.gif">.
```

The value N in the fake address is the Current Number of Fake Hosts (CNFH), which is written in the structure. Then the HPFU 420 replaces, in the OB, the real reference with the modified one. Processing then continues at step 737*a* as described above.

At step 710*a*, if the search reaches the end of the IB, at step 733*a* the HPFU 420 (FIG. 4) checks whether the end of the IB is in the middle of a reference to an object. If so, the HPFU 420 moves the relevant data from the OB to the remainder field in the structure—the HPFU 420 may need this information when it will get the next IB of the same object. Processing then continues at step 750*a*. However, if the HPFU 420 is not in the middle of a reference to an object, the HPFU 420 moves directly to step 750*a* and returns with the modified OB and the updated structure to the SP 410 at step 560 in FIG. 5 without using the remainder area in the structure.

Figure 7B:
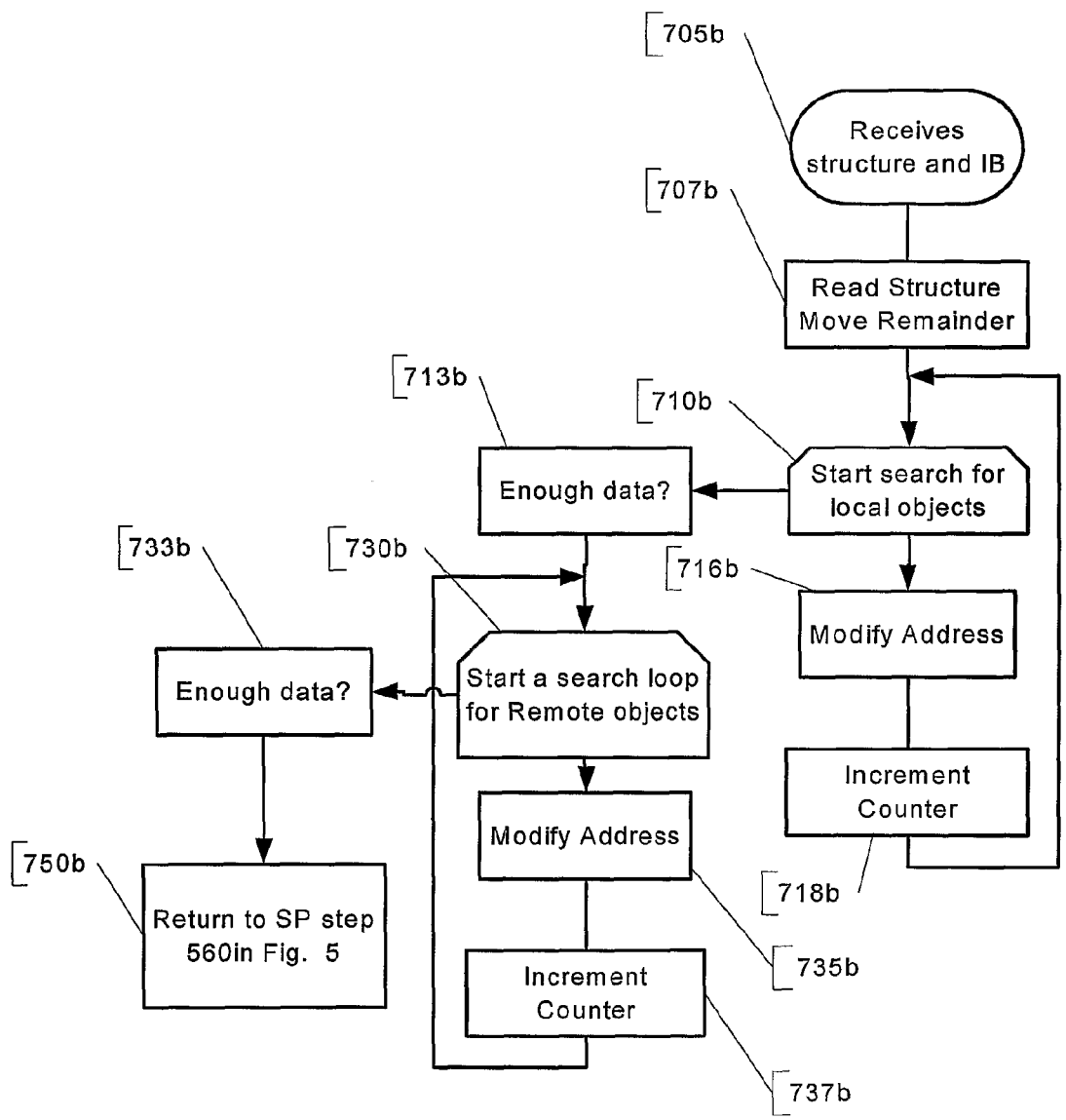

FIG. 7*b* is a flow diagram illustrating another method in which an exemplary HPFU 420 processes an HTML page. The HPFU 420 process 700*b* starts at step 705*b* upon receiving an IB and a structure from the SP 410 (FIG. 4) or from the EU 415 (FIG. 4). At step 707*b*, the HPFU 420 reads the structure, moves the remainder field, if one exists, to the beginning of the input buffer and copies the expanded IB into the OB. The remainder contains information from previous IB that may be needed for processing the current IB.

At step 710*b*, the HPFU 420 searches the expanded IB for references to objects that reside in the same host, the web server. For example, if the WS address is www.walla.co.il, the search engine will look for:

```
<IMG SRC ="/dir/object"> e.g.
<IMG SRC ="/images/2.gif">.
```

The HPFU 420 starts searching for the keyword SRC and then for the two cases.

If the search ends successfully, at step 716*b*, the HPFU 420 modifies 716*b* the reference of the object into a reference of an object that resides in a fake host. The HPFU 420 adds two fields to the reference: one for the fake host and one for the real host with the marker code at the end. The marker code can be doubling the last letter of the real host. For the above examples the new reference will be:

```
<IMG SRC ="http://fake host/real hostt/dir/object"> , e.g.:
<IMG SRC ="http://1.1.1.N/www.walla.co.ill/images/2.gif">.
```

The value of N in the fake address is the Current Number of Fake Hosts (CNFH), which is written in the structure. Then the HPFU 420 replaces, in the OB, the real reference with the fake one.

In another embodiment of the present invention the value N can be used as a pointer to the location in a memory, in which the real address is saved, this location will be used during the re-modification stage.

In other embodiments other parts of the fake address may be used as a pointer to the real address.

Processing then continues at step 718*b* where the HPFU 420 increases the CNFH by one and checks if the new value of CNFH is equal to the Maximum Number Of Fake Hosts (MNOFH), stored in a field in the structure. If the CNFH is equal to the MNOFH, the HPFU 420 sets value of the CNFH to one and then the HPFU 420 returns to step 710*b* for searching the next reference to an object on the web server.

If at step 710*b*, the search reaches the end of the IB, at step 713*b* the HPFU 420 determines if it is in the middle of a reference to an object on the same host. If so, the HPFU 420 moves the relevant data from the OB to the remainder field in the structure and continues at step 730*b*. The HPFU 420 may need this information when it will get the next IB of the same object. If the HPFU 420 is not in the middle of a reference, the HPFU 420 moves directly to step 730*b* and starts a new search on the IB but this time for a reference, which is located in another host, a remote object.

At step 730*b*, the HPFU 420 searches the expanded IB for references to objects that reside on other hosts than the web server. For example, if the web server address is www.walla.co.il, the search engine will look for:

```
<IMG SRC ="http://Real host/dir/object">, for example,
<IMG SRC ="http://flashnetworks.com/images/2.gif">.
```

The HPFU 420 starts searching for the keyword SRC and then for the other cases. If the search ends successfully, at step 735b, the HPFU 420 modifies the reference of the object into a reference of an object that resides in a fake host. The HPFU 420 adds a field for the fake host and adds a marker code at the end of the real host. The marker code may be doubling the last letter of the real host. For the above examples the new reference would be:

```
<IMG SRC ="http://fake host/real hostt/dir/object">, e.g.:
<IMG SRC ="http://1.1.1.N/www.flashnetworks.comm/images/2.gif">.
```

The value N in the fake address is the Current Number of Fake Hosts (CNFH), which is written in the structure. Then the HPFU 420 replaces, in the OB, the real reference with the modified one.

At step 737b, the HPFU 420 increases CNFH by one and checks if the new value of CNFH is equal to the Maximum Number Of Fake Hosts (MNOFH). If the CNFH is equal to the MNOFH, the HPFU 420 sets to the value of the CNFH to one and the HPFU 420 (FIG. 4) returns to step 730b for searching the next reference to an object.

If at step 730b, the search reaches the end of the IB, at step 733b the HPFU 420 checks if it is in the middle of a reference to an object on host other than the web server. If so, the HPFU 420 moves the relevant data from the OB to the remainder field in the structure and processing continues at step 750b. The HPFU 420 may need this information when it will get the next IB of the same object. If the HPFU 420 is not in the middle of a reference to an object, it returns the modified OB and the updated structure to the SP 410 at step 560 in FIG. 5.

There are at least two advantages for the above two methods:
The results of the HPFU 420 for both type of references is the same.
The modified reference includes the real reference.

These two advantages simplify the operation of the RPFU. Other exemplary embodiments may use other methods for modifying the references to an object.

FIG. 8 is a flow diagram illustrating the method in which an exemplary RPFU 425 processes a Request. A client request from a fake host may have the following two terms:
GET/real hostt/dir/object
Host: fake address
For example:
GET/www.cnn.comm/Images/top.gif
Host: 1.1.1.3

The RPFU 425 (FIG. 4) processes 800 begins at step 805 upon receiving an IB and a structure from the SP 410 or from the EU 415. At step 807, the RPFU 425 reads the structure, adds the remainder field, if one exists, to the beginning of the input buffer and copies the expanded IB into the OB. The remainder contains information from a previous IB that may be needed for processing the current IB.

At step 810, the RPFU 425 starts searching the expanded IB for one of the words that indicate a request, for example: GET, POST, HEAD, PUT, DELETE, TRACE, OPTIONS or CONNECT. This description refers to GET as an exemplary representation of each of these words. After finding the term GET, at step 812 the RPFU 425 reads a first field, which indicates the real host, re-modifies the indication to the correct host by removing the last letter (corrects the double letters into a single letter) and saves the real address in the Real Host location of the structure.

At step 814, the RPFU 425 moves a second field, which indicates the location of the object in the real host, and the third field, which is the object name, over the first field and writes the corrected GET term into the OB over the old term. At the end of the above process the OB will have the following term:
GET/dir/object e.g.
GET/Images/top.gif.

After writing the correct sentence for the GET in the OB, at step 820, the RPFU 425 starts searching for the word HOST. Upon finding the word HOST, processing continues at step 822 where the RPFU 425 writes, in the OB, the real address of the host, which has been stored in Real Host location in the structure, over the fake one.

At the end of the process the OB will contain the corrected Request with the following two terms:
GET/dir/object
Host: real host
For example:
GET/Images/top.gif
Host: www.cnn.com At step 830, the RPFU 425 returns the updated structure and updated OB to the SP 410 at step 560 in FIG. 5.

If in both steps 810 and 820 the RPFU 425 reaches the end of the expanded IB in the middle of a string RPFU 425 moves the relevant data from the OB to the remainder field in the structure—the RPFU 425 may need this information when it will get the next IB of the same object.

Other embodiments of the present invention may include, additional module not shown in the drawings, an Integrated Congestion Management Unit (ICMU). An ICMU, as is described in the art, is a TCP flow control unit that collects information from all the TCP connections between the same client/host and based on the integrated flow of all the connections determines the appropriate window size, bit rate, per each connection. Since the present invention opens a large number of TCP connections between a client and an host an ICMU may improve the performance of the present invention.

Those skilled in the art will appreciate that the present invention can be either in the form of additional software residing in the computer of said GW or in the form of additional processors, which serve one or more GWs located on the same site.

The present invention has been described using detailed descriptions of modules that are provided by way of example and is not intended to limit the scope of the invention. Some embodiments of the present invention may comprise different modules for example another embodiment may use a single parsing FU that modifies both objects Request and HTML pages. Another example may use one module with several routines. Another example may use a single buffer instead of the IB and the OB, and modifies the single buffer etc.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A gateway, wherein the gateway includes at least one hardware processor executing software instructions which comprise:
a markup language file parser functional unit, communicatively positioned between a host and a client, and that:
  parses a received data chunk of a markup language file that is received from the host, the received data chunk including references to a plurality of objects that reside on the host;
  identifies within the received data chunk, a Uniform Resource Locator (URL) of a particular object that is referenced in the received data chunk;
  modifies the URL of the particular object to point to a fake host as the source of the particular object; and
  transfers a modified data chunk of the markup language file including the modified URL of the particular object to a spoofer, and the spoofer subsequently sends the modified data chunk to the client;
a request parser functional unit, communicatively positioned between the host and the client and that:
  parses a data chunk of a request that is received from the client for the particular object, the request including the modified URL pointing to the fake host;
  modifies the request of the particular object by restoring the previous URL so that the URL points to the host as the source of the particular object; and
  transfers the modified data chunk of the request toward the host through the spoofer; and
the spoofer that:
  intercepts a communication over a data network;
  identifies a type of received data chunks; and
  transfers received data chunks of markup language files toward the markup language file parser functional unit and transfer received data chunks of requests from the client toward the request parser functional unit;
wherein the gateway is communicatively positioned between the host and the client; and wherein the modified data chunks of the markup language files leads the client to establish, via the gateway, at least one new TCP connection pointing to the fake host as the destination, in addition to the one or more connections pointing to the host as the destination; the gateway subsequently restores the fake host and establishes at least one new TCP connection with the host such that one or more parallel new TCP connections exist between the host and the client via the gateway for each fake host.

2. The gateway of claim 1, further comprising a data structure in which the spoofer maintains information pertaining to the particular object.

3. The gateway of claim 1, wherein the markup language file parser functional unit modifies the URL of the particular object by substituting the host name with a fake host name and maintaining information in the structure to associate the host name with the fake host name.

4. The gateway of claim 3, wherein the request parser functional unit restores the address by detecting and removing a marker code in the fake address.

5. The gateway of claim 3, wherein the request parser functional unit restores a host name by substituting a fake host address with the host address that appears in the structure and that is associated with the fake host address.

6. The gateway of claim 2, wherein the markup language file parser functional unit modifies the URL of the particular object so that it comprise a fake address, and
  wherein the request parser function unit restores the request by restoring the URL to its unmodified value.

7. The gateway of claim 2, wherein the mark up language file parser functional unit replaces the host address of the particular object by substituting the correct address with an invalid address and maintains the relationship between the correct address and the invalid address in the structure.

8. A method, the method comprising the acts of:
at a gateway residing between a host and a client, and performing the acts of:
  parsing a data chunk of a markup language file, received from the host and targeted toward a client, looking for a Uniform Resource Locator (URL) of a particular object, wherein the URL points to a particular host, from a plurality of objects;
  modifying the URL of the particular object in the received data chunk of the markup language file to point to a fake host as the source of the particular object; and
  transferring the modified data chunks of the markup language file toward the client through a spoofer;
  parsing a data chunk of a request received from the client for the particular object;
  restoring the request for the particular object by restoring the previous URL so that the URL points to the particular host as the source of the particular object; and
  transferring the restored data chunk of the request toward the particular host through the spoofer,
wherein the modified data chunks of the markup language files leads the client to establish, via the gateway, at least one new TCP connection pointing to the fake host as the destination, in addition to the one or more connections pointing to the particular host as the destination; the gateway subsequently restores the fake host and establishes at least one new TCP connection with the particular host such that one or more parallel new TCP connections exists between the particular host and the client via the gateway for each fake host.

9. The method of claim 8, wherein the act of modifying the URL of the particular object to point the fake host as the source of the particular object further comprises modifying the URL so that it comprises a fake address that corresponds with the fake host.

10. The method of claim 9, wherein the act of restoring the request for the particular object comprises the step of restoring the URL to its unmodified value thus identifying the particular host.

11. The method of claim 9, wherein the fake address is an invalid IP address.

12. The method of claim 8, further comprising the act of: maintaining information that pertains to the particular object in a data structure associated with the particular object.

13. A method, the method comprising the acts of a gateway residing between a client and a server, and performing the acts of:
receiving at the gateway communicatively positioned between a client and a particular server, a presentation language file from the particular server in response to a request from the client, the presentation language file identifying a particular set of web content to be downloaded to the client, the particular set of web content comprising a plurality of objects residing on the particular server;

modifying the presentation language file so that at least one Uniform Resource Locator (URL) of an object from the particular set of web content appears to reside on a different server other than the particular server;

processing a request from the client for the at least one object over a newly opened TCP connection, the request including the modified URL, and restoring the URL in the request to point to the particular host as the source of the requested object;

wherein the modified data chunks of the markup language files leads the client to establish, via the gateway, at least one new TCP connection pointing to the different server as the destination, in addition to the one or more connections pointing to the particular server as the destination; the gateway subsequently restores the different server and establishes at least one new TCP connection with the particular server such that one or more parallel new TCP connections exists between the particular server and the client via the gateway for each different server.

14. The method of claim 13, wherein the act of modifying the presentation file so that at least one URL of an object from the set of particular web content appears to reside on a different server further comprises the acts of:

modifying the URL so that the URL comprises the address of the different server and transferring the modified presentation language file toward the client.

15. The method of claim 14, wherein the act of processing the request from the client further comprises restoring the URL to so that it no longer comprises the address of the different server and transferring the restored request toward the particular server.

* * * * *